(No Model.)
M. C. BOWERS.
PIPE JOINT.
No. 377,988. Patented Feb. 14, 1888.
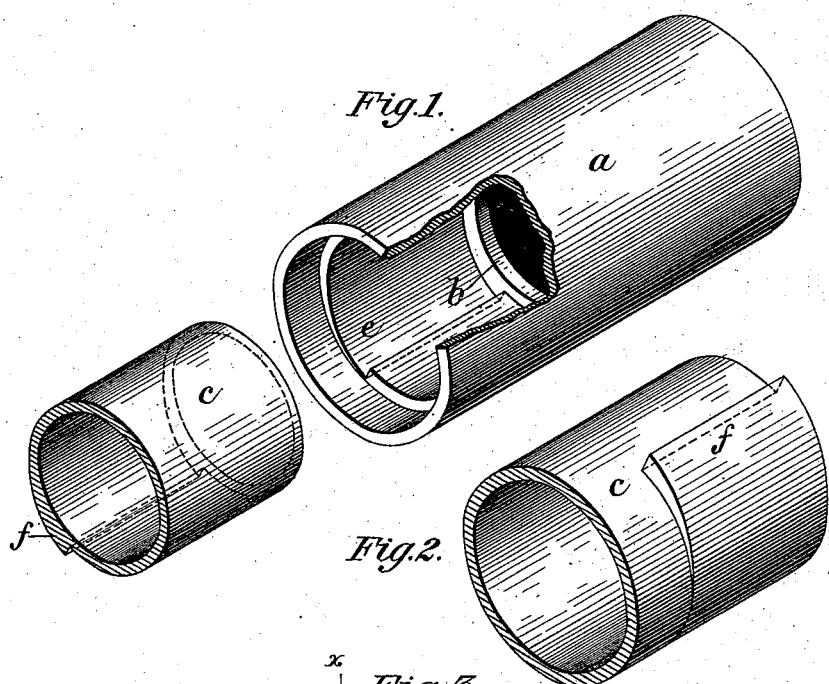
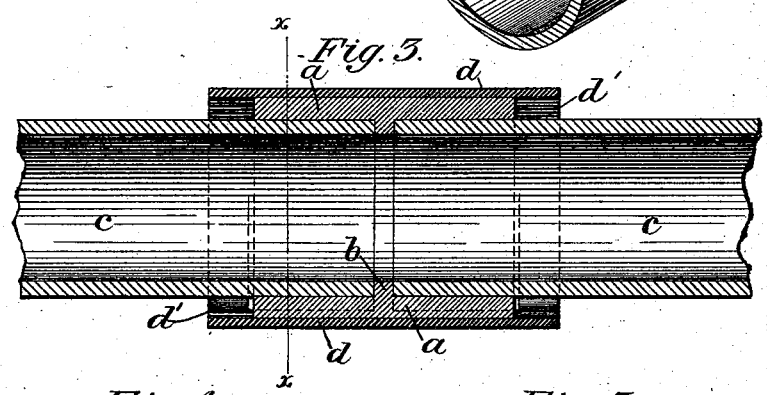
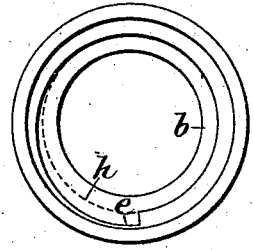
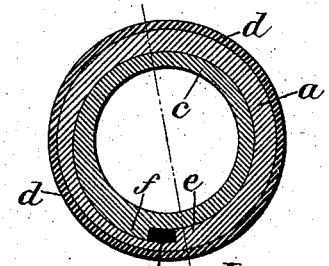
Witnesses.
N. F. Corwin
H. L. Gill
Inventor.
Moses C. Bowers
by his attys
Bakewell & Kerr

UNITED STATES PATENT OFFICE.

MOSES C. BOWERS, OF McKEESPORT, ASSIGNOR, BY DIRECT AND MESNE ASSIGNMENTS, TO EDMUND C. CONVERSE, OF ALLEGHENY CITY, PENNSYLVANIA.

PIPE-JOINT.

SPECIFICATION forming part of Letters Patent No. 377,988, dated February 14, 1888.

Application filed January 6, 1886. Serial No. 187,773. (No model.)

*To all whom it may concern:*

Be it known that I, MOSES C. BOWERS, of McKeesport, in the county of Allegheny and State of Pennsylvania, have invented a new and useful Improvement in Pipe-Joints; and I do hereby declare the following to be a full, clear, and exact description thereof.

My invention relates to all kinds of pipe-joints, but is especially applicable in the construction of natural-gas joints; and its object is to secure a strong tight joint without the necessity of threading the pipes and coupling-sleeves.

To enable others skilled in the art to make and use my invention, I will now describe it by reference to the accompanying drawings, in which—

Figure 1 is a view of a coupling-sleeve and end of pipe-section detached for the purpose of greater clearness of illustration. Fig. 2 is an enlarged view of the end of one of the pipe-sections. Fig. 3 is a longitudinal section of a joint. Fig. 4 is an end view of the coupling-sleeve. Fig. 5 is a section on the line *x x* of Fig. 3.

Like letters of reference indicate like parts in each.

The coupling sleeve or socket *a* is provided with an inwardly-projecting ring, *b*, midway between its ends, of a proper height to stand flush with the bore of the pipe-sections when the latter are put in place, the ends of the pipes *c* abutting against the same, as shown in Fig. 3. On the outside of the sleeve *a* is a wrought-iron tube, *d*, the ends of which project beyond the ends of the sleeve *a*, forming recesses *d'*, for receiving lead or other cement. The innersurface of the coupling, except the ring *b*, is formed or cut on a spiral, as indicated at *e*, forming a curved inclined surface, and on the end of each pipe-section is a corresponding eccentric or projecting part, *f*. When the pipes are inserted into the coupling, the highest point of the projection *f* passes into the deepest point of the surface *e* until the ends of the pipes come in contact with the ring *b*, and then they are rotated upon each other until the inclined surfaces *e* and *f* bind, wedge, or jam tightly together. This produces a very firm union between the pipes and the sleeve, and if they are jammed tightly enough together they will successfully resist all usual axial strains. A difficulty heretofore experienced in natural-gas pipes is that in laying the same a string of pipe often requires to be raised from the surface, and in many couplings now in use the sides of the pipe *c* are embedded in or surrounded by a layer of lead or other cement. The effect of raising the string by lifting at one end is to cause the whole weight to come between the sides of the pipe and the lead packing and to crush the latter to a greater or less extent, which, when the line comes to a horizontal position, has the effect of leaving the joint with a slight opening between the pipe and cement, and this has been a fruitful cause of leakage and probably of some accidents therefrom.

In my improved coupling the whole length of the inserted ends of the pipe *c* bears against the inner surface of the coupling, so that there is no danger of any damage being done to the joints by lifting a string of pipe in the manner stated; but, on the other hand, such a string may be handled for all usual purposes with perfect security. When the pipes are properly secured in the sleeve *a*, there will be a space, *g*, Fig. 5, between the vertical sides of the inclines *e* and *f*. This space will be filled with the lead or other packing material, which is poured or driven into the recess *d*, and such material will act as a key to hold the pipes from turning backward if by any reason they should become loosened in the sockets.

If desired, the ring *b* may be dispensed with, and in that case the inward thrust of the pipe *c* when being put in place will be arrested at the proper point by a shoulder which is formed at the inner end of the deepest part of the inclined surface *e*, the same being indicated at *h* below the dotted lines in Fig. 4; or, if desired, the pipes may be inserted until their ends strike each other. The coupling *a* and pipes *c*, with their inclined surfaces *e* and *f*, are more easily and cheaply made by casting, and I prefer to make them in that way.

I am aware that the combination, in a pipe-joint, of a cast-iron sleeve for engaging with the tube-sections and a wrought-iron casing or tube the ends of which extend beyond the ends of the sleeve is not of my invention, and hence do not claim the same.

What I claim as my invention, and desire to secure by Letters Patent, is—

1. A cylindrical pipe-coupling sleeve the internal surface of which gradually increases in curvature from a given point in its circumference, thus giving an eccentric or cam-like interior surface, substantially as described.

2. The combination of a cylindrical pipe-coupling sleeve the internal surface of which gradually increases in curvature from a given point in its circumference, thus giving an eccentric or cam-like interior surface, with pipes having counterpart projections, substantially as described.

In testimony whereof I have hereunto set my hand this 30th day of December, A. D. 1885.

MOSES C. BOWERS.

Witnesses:
THOMAS REYNOLDS,
JAMES L. DE LONG.